United States Patent
Bose et al.

(10) Patent No.: US 8,516,426 B2
(45) Date of Patent: Aug. 20, 2013

(54) VERTICAL POWER BUDGETING AND SHIFTING FOR THREE-DIMENSIONAL INTEGRATION

(75) Inventors: Pradip Bose, Yorktown Heights, NY (US); Gary D. Carpenter, Austin, TX (US); Michael S. Floyd, Cedar Park, TX (US); Eren Kursun, Yorktown Heights, NY (US); Phillip J. Restle, Katonah, NY (US); Michael R. Scheuermann, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/217,429

(22) Filed: Aug. 25, 2011

(65) Prior Publication Data
US 2013/0055185 A1 Feb. 28, 2013

(51) Int. Cl.
*G06F 17/50* (2006.01)
*G06F 9/455* (2006.01)
*G06F 11/22* (2006.01)

(52) U.S. Cl.
USPC .......................... 716/120; 716/133; 716/136

(58) Field of Classification Search
None
See application file for complete search history.

(56) References Cited

U.S. PATENT DOCUMENTS

| | | | |
|---|---|---|---|
| 4,276,594 A * | 6/1981 | Morley | 713/600 |
| 4,868,712 A | 9/1989 | Woodman | |
| 5,200,631 A | 4/1993 | Austin et al. | |
| 5,280,184 A | 1/1994 | Jokerst et al. | |
| 5,655,290 A | 8/1997 | Moresco et al. | |
| 5,702,984 A | 12/1997 | Bertin et al. | |
| 6,141,245 A | 10/2000 | Bertin et al. | |
| 6,258,623 B1 | 7/2001 | Moden et al. | |
| 6,569,762 B2 | 5/2003 | Kong | |
| 6,982,869 B2 | 1/2006 | Larson | |
| 7,021,520 B2 | 4/2006 | Bowen | |
| 7,030,486 B1 | 4/2006 | Marshall | |
| 7,067,910 B2 | 6/2006 | Drost et al. | |
| 7,521,950 B2 | 4/2009 | Bernstein et al. | |

(Continued)

FOREIGN PATENT DOCUMENTS
FR 2946182 A1 12/2010

OTHER PUBLICATIONS

Badaroglu et al., "Clock-skew-optimization methodology for substrate-noise reduction with supply-current folding" ICCAD, vol. 25. No. 6, pp. 1146-1154, Jun. 2006.

(Continued)

*Primary Examiner* — A. M. Thompson
(74) *Attorney, Agent, or Firm* — Tutunjian & Bitetto, P.C.; Louis J. Percello

(57) ABSTRACT

A method is provided for managing power distribution on a three-dimensional chip stack having two or more strata, a plurality of vertical power delivery structures, and multiple stack components. At least two stack components are on different strata. Operating modes are stored that respectively have different power dissipations. A respective effective power budget is determined for each of the at least two stack components based on respective ones of the operating modes targeted therefor, and power characteristics and thermal characteristics of at least some of the stack components inclusive or exclusive of the at least two stack components. The respective ones of the plurality of operating modes targeted for the at least two stack components are selectively accepted or re-allocated based on the respective effective power budget for each of the at least two stack components, power constraints, and thermal constraints. The power constraints include vertical structure electrical constraints.

25 Claims, 6 Drawing Sheets

(56) References Cited

U.S. PATENT DOCUMENTS

| | | |
|---|---|---|
| 7,615,869 B2 | 11/2009 | Koo et al. |
| 7,623,398 B2 | 11/2009 | Arai |
| 7,701,251 B1 | 4/2010 | Rahman et al. |
| 7,710,329 B2 | 5/2010 | Chiozzi |
| 7,753,779 B2 | 7/2010 | Shayesteh |
| 7,768,790 B2 | 8/2010 | Kuroda et al. |
| 7,772,708 B2 | 8/2010 | Leddige et al. |
| 7,830,692 B2 | 11/2010 | Chung et al. |
| 7,863,960 B2 | 1/2011 | Wang et al. |
| 2002/0089831 A1 | 7/2002 | Forthun |
| 2004/0177237 A1 | 9/2004 | Huppenthal et al. |
| 2005/0058128 A1 | 3/2005 | Carson et al. |
| 2006/0043598 A1 | 3/2006 | Kirby et al. |
| 2007/0033562 A1 | 2/2007 | Corraele et al. |
| 2007/0047284 A1 | 3/2007 | Silvestri |
| 2007/0132070 A1 | 6/2007 | V. Buot et al. |
| 2007/0287224 A1 | 12/2007 | Alam et al. |
| 2007/0290333 A1 | 12/2007 | Saini et al. |
| 2008/0068039 A1 | 3/2008 | Bernstein et al. |
| 2008/0204091 A1 | 8/2008 | Choo et al. |
| 2009/0024789 A1 | 1/2009 | Rajan et al. |
| 2009/0055789 A1 | 2/2009 | McIlrath |
| 2009/0064058 A1* | 3/2009 | McIlrath ............... 716/1 |
| 2009/0070549 A1 | 3/2009 | Solomon |
| 2009/0070721 A1 | 3/2009 | Solomon |
| 2009/0144678 A1* | 6/2009 | Bose et al. ............ 716/5 |
| 2009/0168860 A1 | 7/2009 | Magagni et al. |
| 2009/0196312 A1 | 8/2009 | Kuroda |
| 2009/0237970 A1 | 9/2009 | Chung |
| 2009/0245445 A1 | 10/2009 | Saen et al. |
| 2009/0323456 A1 | 12/2009 | Gomm |
| 2010/0001379 A1 | 1/2010 | Lee et al. |
| 2010/0005437 A1* | 1/2010 | McIlrath ............... 716/10 |
| 2010/0044846 A1 | 2/2010 | Ohmi et al. |
| 2010/0059869 A1 | 3/2010 | Kaskoun et al. |
| 2010/0332193 A1 | 12/2010 | Hu et al. |
| 2011/0016446 A1 | 1/2011 | Krebd |
| 2011/0032130 A1 | 2/2011 | Ludwig |
| 2011/0121811 A1* | 5/2011 | Dennard et al. ........ 323/318 |

OTHER PUBLICATIONS

Chan et al., "A Resonant Global Clock Distribution for the Cell Broadband Engine Processor" IEEE J. Solid State Circuits, vol. 44, No. 1, pp. 64-72, Jan. 2009.

Gutnik et al., "Active GHz Clock Network Using Distributed PLLs" IEEE JSSC, vol. 35, No. 11, pp. 1553-1560, Nov. 2000.

Lam et al., "Power supply noise suppression via clock skew scheduling," in Proceedings of International Symposium on Quality Electronic Design, pp. 355-360, Mar. 2002.

Miura et al., "A 2.7Gb/s/mm2 0.9pj/b/Chip 1Coil/Channel ThruChip Interface with Coupled-Resonator-Based CDR for NAND Flash Memory Stacking," ISSCC, pp. 490-491, Feb. 2011.

Pavlidis et al., "Clock distribution networks for 3-D integrated Circuits", IEEE CICC, pp. 651-654, Sep. 2008.

Restle et al., "A Clock Distribution Method for Microprocessors", IEEE JSSC, vol. 36, No. 5, pp. 792-799, May 2001.

Tam et al., "Clock Generation and distribution for the first IA-64 Microprocessor", IEEE JSSC vol. 35, No. 11, pp. 1545-1552, Nov. 2000.

* cited by examiner

VERTICAL POWER BUDGETING AND SHIFTING FOR THREE-DIMENSIONAL INTEGRATION

CROSS-REFERENCE TO RELATED APPLICATIONS

This application is related to the following commonly assigned applications, all concurrently filed herewith and incorporated herein by reference: U.S. application Ser. No. 13/217,734, entitled "PROGRAMMING THE BEHAVIOR OF INDIVIDUAL CHIPS OR STRATA IN A 3D STACK OF INTEGRATED CIRCUITS"; U.S. application Ser. No. 13/217,335, entitled "SYNCHRONIZING GLOBAL CLOCKS IN 3D STACKS OF INTEGRATED CIRCUITS BY SHORTING THE CLOCK NETWORK"; U.S. application Ser. No. 13/217,349, entitled "3D CHIP STACK SKEW REDUCTION WITH RESONANT CLOCK AND INDUCTIVE COUPLING"; U.S. application Ser. No. 13/217,767, entitled "3D INTEGRATED CIRCUIT STACK-WIDE SYNCHRONIZATION CIRCUIT"; U.S. application Ser. No. 13/217,789, entitled "CONFIGURATION OF CONNECTIONS IN A 3D STACK OF INTEGRATED CIRCUITS"; U.S. application Ser. No. 13/217,381, now U.S. Pat. No. 8,381,156, entitled "3D INTER-STRATUM CONNECTIVITY ROBUSTNESS"; and U.S. application Ser. No. 13/217,406, entitled "AC SUPPLY NOISE REDUCTION IN A 3D STACK WITH VOLTAGE SENSING AND CLOCK SHIFTING".

BACKGROUND

1. Technical Field

The present invention relates generally to integrated circuits and, in particular, to vertical power budgeting and shifting for three-dimensional integration.

2. Description of the Related Art

A three-dimensional (3D) stacked chip includes two or more electronic integrated circuit chips (referred to as layer or stratum) stacked one on top of the other. The strata are connected to each other with inter-strata interconnects that could use C4 or other technology, and the strata could include through-Silicon vias (TSVs) to connect from the front side to the back side of the strata or other forms. The strata could be stacked face-to-face or face-to-back where the active electronics can be on any of the "face" or "back" sides of a particular stratum.

While performance advantages have attracted attention, 3D integrated circuits are reported to be power and temperature limited due to the increased number of layers per footprint area. In a 3D stack, power dissipation per unit area increases while cooling per unit area is effectively reduced by the increased packaging density.

This becomes even more prominent in high power/density options such as processor stacking options. In a 3D stacking, high power density areas can be vertically aligned without careful optimization. The resulting power density causes power delivery and C4 current issues along the corresponding vertical columns (vertical structures, e.g., TSVs and C4 connections).

Since the limited power delivery resources are shared among strata vertically (i.e., in the form of through-Silicon vias (TSVs) and micro C4 (uC4) structures), specific management techniques are needed to address the cases where the different strata compete for the limited current and power budget resources.

SUMMARY

According to an aspect of the present principles, there is provide a method for managing power distribution on a 3D chip stack having two or more strata, a plurality of vertical power delivery structures, and multiple stack components. At least two stack components of the multiple stack components are on different ones of the two or more strata. The method includes storing a plurality of operating modes that respectively have different power dissipations. The method further includes determining a respective effective power budget for each of the at least two stack components based on respective ones of the plurality of operating modes targeted for the at least two stack components, and power characteristics and thermal characteristics of at least some of the stack components inclusive or exclusive of the at least two stack components. The method also includes selectively accepting or re-allocating the respective ones of the plurality of operating modes targeted for the at least two stack components based on the respective effective power budget for each of the at least two stack components, power constraints, and thermal constraints. The power constraints include vertical structure electrical constraints.

According to another aspect of the present principles, there is provided a power manager for a 3D chip stack having two or more strata, a plurality of vertical power delivery structures, and multiple stack components. At least two stack components of the multiple stack components are on different ones of the two or more strata. The power manager includes a memory for storing a plurality of operating modes having different power dissipations. The power manager further includes a controller for determining a respective effective power budget for each of the at least two stack components based on respective ones of the plurality of operating modes targeted for the at least two stack components, and power characteristics and thermal characteristics of at least some of the stack components inclusive or exclusive of the at least two stack components. The controller selectively accepts or re-allocates the respective ones of the plurality of operating modes targeted for the at least two stack components based on the respective effective power budget for each of the at least two stack components, power constraints, and thermal constraints. The power constraints include vertical structure electrical constraints.

According to yet another aspect of the present principles, there is provided a method for managing power distribution on a 3D chip stack having two or more strata and multiple stack components. The multiple stack components include two or more processors on different ones of the two or more strata and a plurality of vertical power delivery structures. The method includes storing a plurality of processor operating modes that respectively have different power dissipations. The method further includes determining a respective effective power budget for each of the two or more processors based on respective ones of the plurality of processor operating modes targeted for the two or more processors, and power characteristics and thermal characteristics of at least some of the stack components. The method also includes shifting the respective effective power budget for at least one of the two or more processors from at least a portion of one of the plurality of vertical power delivery structures to at least another portion of a same or another one of the plurality of vertical power delivery structures, when the respective power budget for the at least one of the two or more processors is not met. The power constraints include vertical structure electrical constraints.

According to still another aspect of the present principles, there is provided a power manager for a 3D chip stack having two or more strata and multiple stack components. The multiple stack components include two or more processors on different ones of the two or more strata and a plurality of vertical power delivery structures. The power manager includes a memory for storing a plurality of processor operating modes having different power dissipations. The power manager further includes a controller for determining a respective effective power budget for each of the two or more processors based on respective ones of the plurality of processor operating modes targeted for the two or more processors, and power characteristics and thermal characteristics of at least some of the stack components. The controller shifts the respective effective power budget of at least one of the two or more processors from at least a portion of one of the plurality of vertical power delivery structures to at least another portion of a same or another one of the plurality of vertical power delivery structures, when the respective power budget for the at least one of the two or more processors is not met. The power constraints include vertical structure electrical constraints.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to vertical power budgeting and shifting for 3D integration.

In a 2D design, the nominal power budget is the same as effective power budget. However in a 3D design, because of the resistive losses on the vertical power delivery infrastructure (like TSVs), in order to deliver an effective power budget P1 (in usable Watts) for one or more functional units on a particular Layer N, one needs to allocate an effective power budget P2 (such that P2>P1) at the C4 level.

Another differentiator between a 2D design and a 3D design is the thermal constraints, where a P1 Watts power budget would require a much larger P3 Watts reduction in the other chip regions in order to maintain the Thermal Design Envelope due to the vertical thermal resistances. These concepts are described in further detail hereinafter.

It is important to note that the effective budget for a block can vary significantly depending on the stack characteristics, its location in terms of layer ordering, shared power delivery infrastructure characteristics and cooling characteristics as well as its relation to the vertical neighboring regions. The proposed technique provides a unique power management that specifically targets this special case power budgeting in 3D environments. It also provides a way of redistributing the power budget dynamically as the demands of the vertical neighbors (which share a power delivery structure) change in time.

Figure 1:
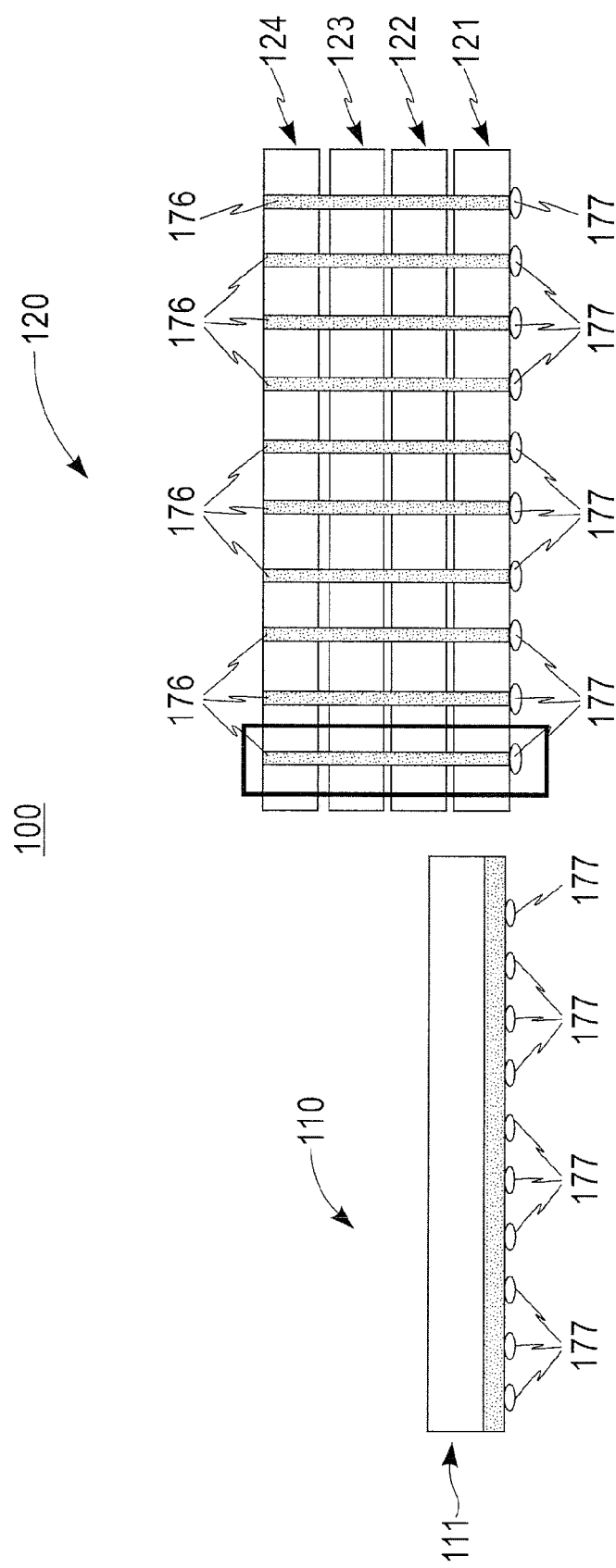
FIG. 1 shows a comparison 100 between a two-dimensional (2D) chip arrangement 110 and a three-dimensional (3D) chip stack 120 with respect to power delivery and budgeting.

FIG. 1 shows a comparison 100 between a two-dimensional (2D) chip arrangement 110 and a three-dimensional (3D) chip stack 120 with respect to power delivery and budgeting. 2D chip arrangement 110 includes a stratum-1 111. 3D chip arrangement 120 includes a stratum-1 121, a stratum-2 122, a stratum-3 123, and a stratum-4 124. The power delivery infrastructure is homogenous in the 2D chip arrangement 110 (where every unit in the chip has direct access to the C4s 177 at the bottom of the chip). In the 3D chip, the top strata in the stack receive power indirectly through the micro C4 177 and TSV 176 chains that go vertically in the stack. This implies resource contention among the units that vertically align in the stack on top of a given C4 area. That is, the blocks in vertical alignment in the three-dimensional (3D) chip stack 120 get into power budget (and potentially current) resource contention due to the shared infrastructure, which is not the case for the two-dimensional (2D) chip arrangement 110. In addition, the power delivery and cooling efficiency are different for different strata. This implies that a given P Watts power budget can translate to significantly different values, thus requiring specialized techniques to address the aforementioned points. Thus, in 2D, the effective and nominal power budgets are the same, whereas in 3D the inherent vertical power delivery constraints and power delivery efficiency differences (which become increasingly prominent in the upper strata of the 3D stacks) make nominal and effective values different.

The present principles provide 3D-aware dynamic power budgeting for power/temperature limited applications. For example, a controller structure or controller and a corresponding 3D-aware power budget assignment method are provided in order to address the vertical power and temperature constraints of the 3D stack. The controller may be a dedicated controller (e.g., processor, ASIC, and so forth), or may be a processor that is shared externally (i.e., not used solely for the purposes of the present principles). The controller may have its own memory, or may use a memory that is shared externally (i.e., not used solely for the purposes of the present principles).

The proposed controller structure and method determine the power budget and the corresponding operating modes for any of functional units, processing elements, and memory units in a 3D chip stack based on a set of power/performance constraints. Thus, the present principles provide power budgeting and management capability in heterogeneous 3D stacks, in which the different device strata can be in disparate technologies or different technology generations. Stack-level power shifting provides a protocol that enables co-operation between different strata, which may have conflicting demands from a power budgeting perspective (given the limited power delivery and cooling constraints).

Figure 2:
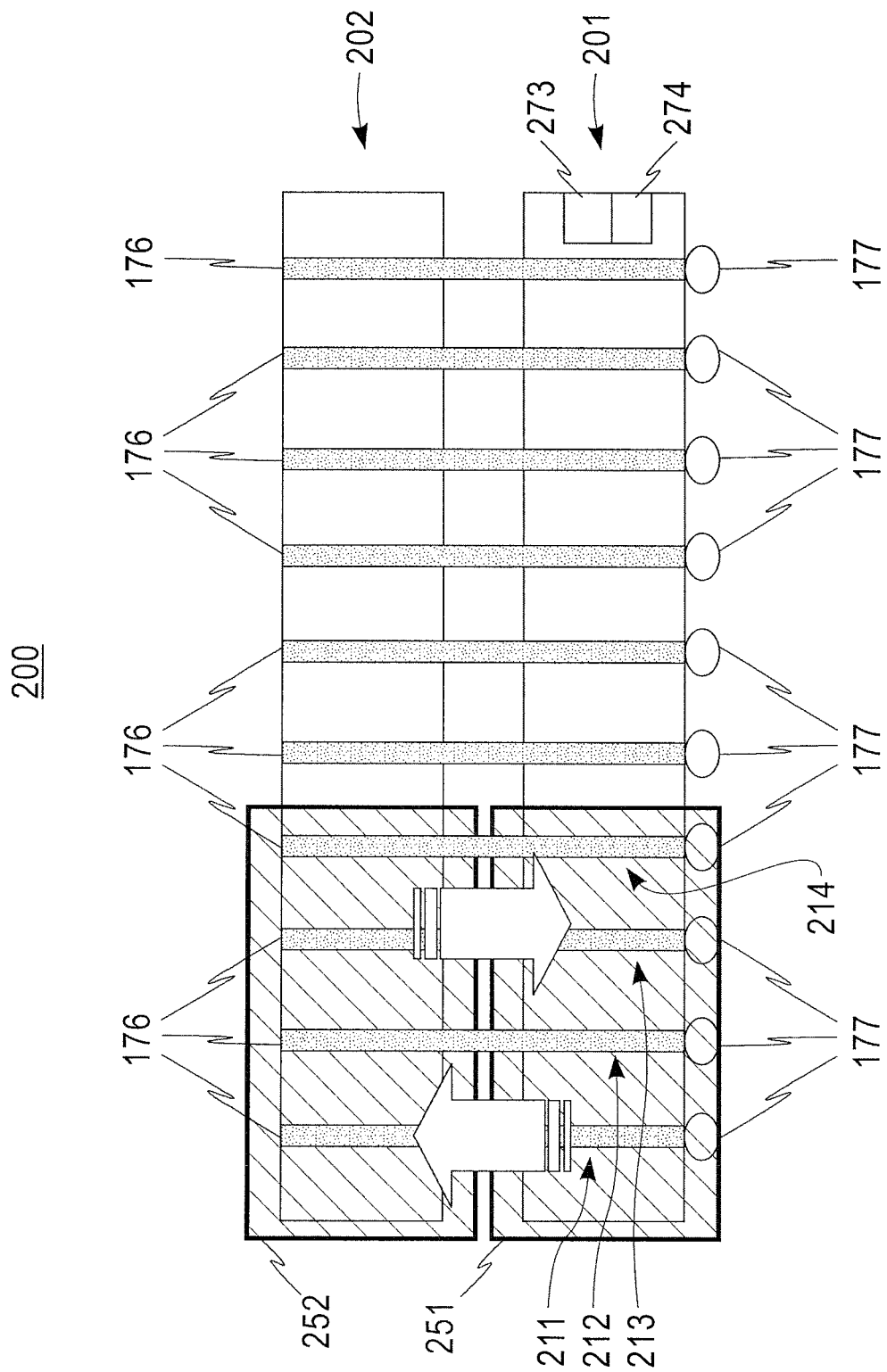
FIG. 2 shows a 3D chip stack 200 to which the present principles can be applied, in accordance with an embodiment of the present principles.

FIG. 2 shows a 3D chip stack 200 to which the present principles can be applied, in accordance with an embodiment of the present principles. In particular, the chip stack 200 is suitable for vertical power shifting in accordance with one or more embodiments of the present principles. The 3D chip stack 200 includes a stratum-1 201 and a stratum-2 202. Stratum-1 201 includes a core-1 251, and stratum-2 202 includes a core-2 252. The strata are interconnected using, e.g., C4s 177 and TSVs 176. Vertical paths 211, 212, 213, and 214 are used to supply power to core-1 251 and core-2 252. However, a shared power delivery infrastructure limits the total current on the vertical paths. For example, a turbo mode applied to core-1 251 constrains the processor current for core-2 252. Moreover, different power efficiency modes and turbo-boost modes impart varying current demands on each of the cores 251 and 252.

In accordance with an embodiment of the present principles, vertical management of stacked cores for temperature and current delivery can be applied to 3D chip stack 200, as described in further detail herein below. To that end, the 3D chip stack 200 includes a controller 273 and a memory 274. The functions of the controller 273 and memory 274 are described in further detail herein. While shown separately from core-1 251 and core-2 252, it is to be appreciated that in one or more other embodiments the functions of controller 273 may be performed by core-1 251 and/or core-2 252, while maintaining the spirit of the present principles.

Figure 3:
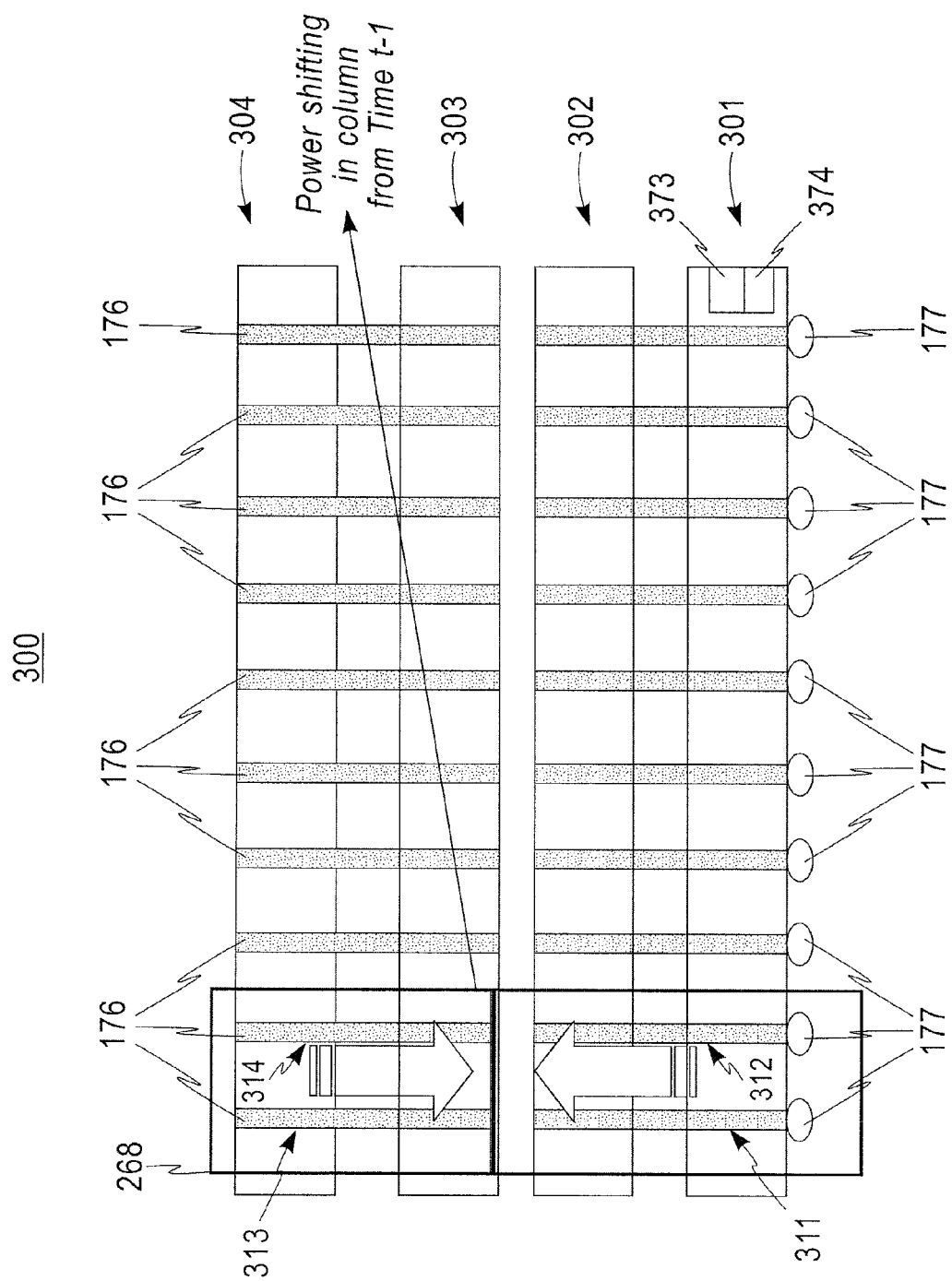
FIG. 3 shows another 3D chip stack 300 to which the present principles can be applied, in accordance with an embodiment of the present principles.

FIG. 3 shows another 3D chip stack 300 to which the present principles can be applied, in accordance with an embodiment of the present principles. In particular, the chip stack 300 is suitable for unit-level vertical power shifting in accordance with one or more embodiments of the present principles. The 3D chip stack 300 includes a stratum-1 301, a stratum-2 302, a stratum-3 303, and a stratum-4 304. The strata are interconnected using, e.g., C4s 177 and TSVs 176. Vertical paths 311 and 312 are used to supply power to stratum-1 301 and stratum-2 302, while vertical paths 313 and 314 are used to supply power to stratum-3 303 and stratum-4 304. The difference between effective and nominal power values are caused by the inherent inefficiencies of the vertical power delivery network (e.g., IR drop on the TSVs) or the effective design point that the stratum is allowed due to the thermal envelope. For stratum-1 301, nominal power=P1 Watts, and effective power=P1*Watts. For stratum-2 302, nominal power=P2 Watts, and effective power=P2*Watts. For stratum-3 303, nominal power=P3 Watts, and effective power=P3*Watts. For stratum-4 304, nominal power=PN Watts, and effective power=PN*Watts (where N=4, for the fourth stratum in this example). The column power budget for column 268=$\Sigma$ $P_{\mathit{eff}}$*. As a result of the difference between effective and nominal power values and the vertical power delivery constraints in a given column of the 3D stack, specialized vertical power budgeting is needed.

In accordance with an embodiment of the present principles, vertical management of stacked cores for temperature and current delivery can be applied to 3D chip stack 300, as described in further detail herein below. To that end, 3D chip stack 300 includes a controller 373 and a memory 374. The functions of the controller 373 and memory 374 are described in further detail herein.

A power budget distribution method in accordance with an embodiment of the present principles that provides maximum performance and energy efficiency accommodates short term power peaks in workload behavior. For example, consider the following: (1) $P_{total}$ Watts power for a vertical column; and (2) region power limitations. We note that the region power limitations may involve, but are not limited to, one or more of the following functional units: vector scalar units (VSUs), arithmetic logic units (ALUs), floating point units (FPUs), fixed point units (FXUs), instruction scheduling units (ISUs), caches, registers, memory management units (MMUs), control units, and so forth. In accordance with an embodiment of the present principles, we decide on a per stratum/region power budget, simultaneous multi-threading (SMT) mode (potentially affecting regional current), and performance targets (shifting power from the same stratum or vertical stack).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It is to be further appreciated that while one or more embodiments described herein may refer to the use of Silicon with respect to a chip or a through via, the present principles are not limited to using only chips or vias made from Silicon and, thus, chips or vias made from other materials including but not limited to Germanium and Gallium Arsenide may also be used in accordance with the present principles while maintaining the spirit of the present principles. Moreover, it is to be further appreciated that while one or more embodiments described herein may refer to the use of C4 or micro C4 (uC4) connections, the present principles are not limited to solely using C4 or micro C4 connections and, thus, other types of connections may also be used while maintaining the spirit of the present principles.

It is to be understood that the present invention will be described in terms of a given illustrative architecture having a wafer; however, other architectures, structures, substrate materials and process features and steps may be varied within the scope of the present invention.

It will also be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A design for an integrated circuit chip of photovoltaic device may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Thus, in accordance with an embodiment of the present principles, one or more target processor operating modes are selected for a corresponding one or more processors in a 3D chip stack. Unit-level power budgets are determined based on the target processor operating modes as well as power and temperature constraints as described in further detail herein. Effective power budgets for each processor are then determined based on the unit-level power budgets as well as the power and temperature constraints. Power shifting, which shifts power dissipation through the 3D chip stack, may be implemented based on the effective power budgets. Each of these aspects will now be described.

We note that various embodiments of the present principles may use a unit-level and/or a core-level granularity for power (e.g., current) and thermal limits specified in accordance with an embodiment of the present principles. Hence, as used herein, core-level granularity refers to limits specified on a processor core basis (i.e., respective limits on each processor core in a given chip stack). Moreover, as used herein, unit-level granularity refers to limits specified on a unit basis (i.e., respective limits on each unit in a given chip stack). As used herein, a unit refers to a functional unit in the 3D chip stack. Functional units include, but are not limited to, vector scalar units (VSUs), arithmetic logic units (ALUs), floating point units (FPUs), fixed point units (FXUs), instruction scheduling units (ISUs), caches, registers, memory management units (MMUs), control units, and so forth.

The proposed controller is given multiple operating modes for each processing unit including a normal operating mode, a power gating mode, voltage/frequency boost or scaling modes, and simultaneous multi-threading (SMT) options (single threaded (ST) to SMT_N) modes. The total power dissipation and regional power dissipation (as well as corresponding current levels) are different for each of these individual options. For example, the total FXU power differs between the normal operating mode, the voltage boost mode and the ST/SMT4/8 modes. The multiple operating modes may be stored in a memory such as memory 274 or memory 374. Moreover, such memories 274 and 374 may store program code for performing one or more methods in accordance with the present principles. The code stored in the memories is executed by a controller such as controller 273 or controller 373.

The controller architecture is also provided the 3D floorplan information such that the unit/macro coordinates especially focus on the vertical overlaps that potentially share the power delivery infrastructure.

Thus, in one embodiment of the present principles, power budgeting can be done at the unit level within the processing unit, where the technique leverages the unit/macro level information (instead of purely relying on the core level). In most cases, the power dissipation/density numbers peak at the unit level. As a result, the technique tracks the unit-level estimates to determine the budget and operating mode. For example, if the VSU region will exceed the power density limits, even though the total power budget and current budget are within limits, then the corresponding mode is not accepted by the controller. That is, if the VSU region will exceed the power density limits in the next time cycle (even though the total power budget and current budget are within limits, e.g., if aligned with an instruction scheduling unit (ISU) change SMT mode), then the corresponding mode is not accepted by the controller structure.

Hence, unit-level budgeting leverages the unit/macro level power delivery information, instead of purely relying on the core or chip level power budget. That is, in unit-level budgeting, the power mode of an individual core or memory region is determined by the power delivery constraints of the worst case unit or macro power demands. Unit level budgeting implies a traditional core-level budgeting division is not appropriate in 3D. The budget is determined at much finer grain (due to the fine power delivery columns and constraints). This dictates the core-level power.

Regarding multiple constraints, the effective and nominal power values are assigned and dynamically adjusted with vertical power delivery, layer and stack-level constraints and goals.

As used herein, "effective power budgeting" refers to the useable power budget (of a processing/memory unit) after the temperature and power delivery characteristics are factored in. For example, if the power budget is used at the package stratum in the bottom of a stack, the corresponding power budget is different from the alternative case where the power is used up in the top level. Thus, each stratum/region in the stack is assigned an effective power budget coefficient for power delivery/temperature purposes.

Hence, effective power budgeting in accordance with an embodiment of the present principles translates the nominal power requests of the individual blocks or strata in the 3D stack to the effective power values by factoring in the following:

(a) the inherent efficiency differences in the power delivery (where the upper strata in the stack have inherently lower power efficiency due to the IR drop) if the power is delivered from the C4s at the bottom of the stack using TSVs; and (b) the power constraints in the vertical power delivery infrastructure (where the uC4 and shared TSV power delivery infrastructure determines the resource constraints). The effective power values are then used by the stack level controller for power budget assignment and distribution.

Power shifting in accordance with an embodiment of the present principles operates given the power budget and delivery limitations specified herein. If the power budget requested by the processing unit is not met, then the controller may shift the power budget within the stratum and vertical columns (within the power/performance/temperature constraints).

As used herein, "vertical power shifting" refers to dynamically shifting a power budget up and/or down a vertical stack in a 3D chip stack based on one or more constraints and/or one or more efficiency targets. Thus, given the power budget and delivery limitations, the controller determines the power budget allocated to an individual core and the budget shifting for the next cycle. Hence, if the power budget requested by the processing mode is not met, then the controller may shift the power budget within the vertical columns (for the power/performance/temperature constraints). At any given time the controller estimates the next step requirements of the stack and decides on the power shifting actions. The controller also generates the control signals for certain modes for the corresponding processing units.

At any given time the controller determines the next step requirements of the stack and decides on the power shifting actions. The controller also generates the control signals for the aforementioned modes for the corresponding processing units.

Figure 4:
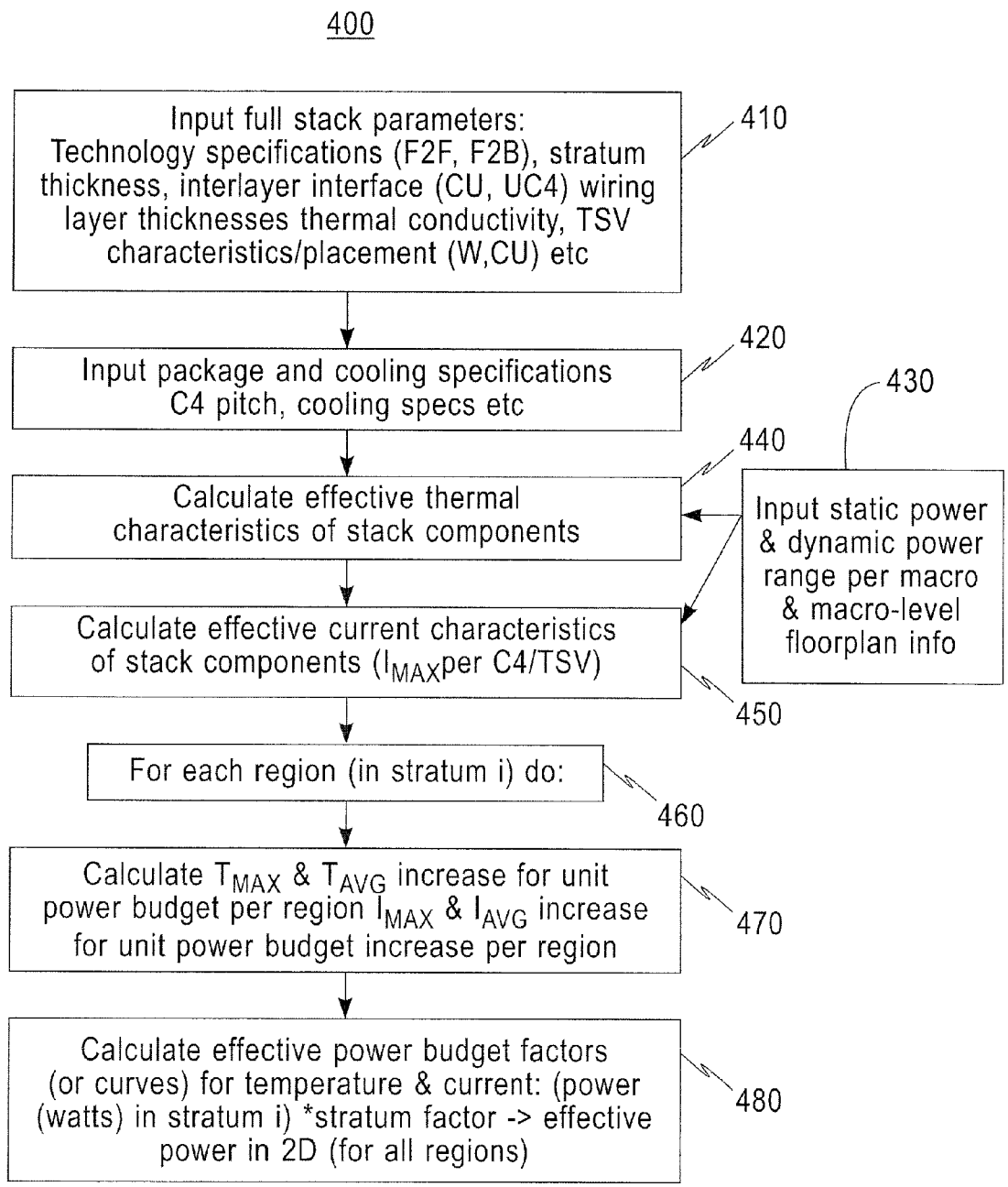
FIG. 4 shows a method 400 for determining region-level power budgets for a 3D chip stack, in accordance with an embodiment of the present principles.

FIG. 4 shows a method 400 for determining region-level power budgets for a 3D chip stack, in accordance with an embodiment of the present principles.

At step 410, the full stack parameters are input. Such parameters may include, but are not limited to, technology specifications (face-to-face (F2F), front-to-back (F2B)), stratum thickness, interlayer interface (Cu, uC4), wiring layer thicknesses, thermal conductivity, TSV characteristics/placement (Tungsten (W), Copper (Cu), etc.), and so forth.

At step 420, the package and cooling specifications are input. Such specification may include, but are not limited to, C4 pitch, cooling specifications, and so forth.

At step 430, information such as static power, dynamic power range per macro, and macro-level floor-plan information are provided for use by subsequent steps 440 and 450. As used herein, "macro" refers to a floor-plannable object typically between 1 to 50K gates. Further, as used herein, "floor-plan" refers to a representation or collection of information that shows and/or otherwise indicates the physical locations of the components in the chip stack.

At step 440, the effective thermal characteristics of the stack components are calculated, based on at least some of the information provided by step 430.

At step 450, the effective current characteristics of the stack components, namely $I_{MAX}$ per C4/TSV is calculated, based on at least some of the information provided by step 430.

At step 460, a loop is commenced for each region in stratum i, where the loop performs subsequent steps 470 and 480.

At step 470, the $T_{MAX}$ increase and the $T_{AVG}$ increase for unit power budget per region, and the $I_{MAX}$ increase and the $I_{AVG}$ increase for a unit power budget increase per region (can be down to the macro level) are calculated. $T_{MAX}$ and $T_{AVG}$ denote the maximum temperature and average temperature, respectively. $I_{MAX}$ and $I_{AVG}$ denote the maximum current and average current, respectively.

At step 480, effective power budget factors (or curves) are calculated for temperature and current. For example, the following equation may be used: (power (watts) in stratum i)*stratum factor=effective power in 2D (for all regions).

Figure 5A:
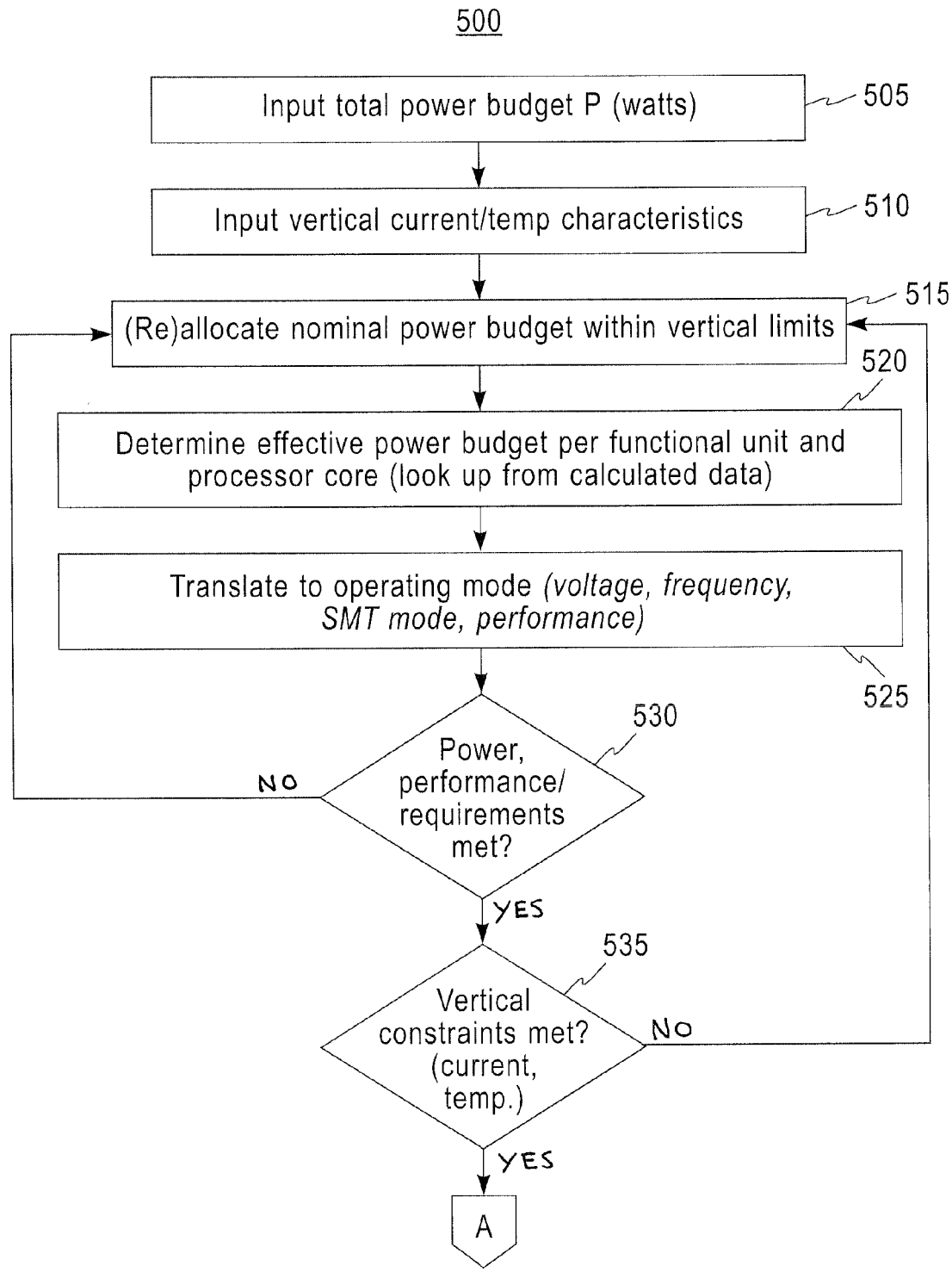
FIGS. 5A and 5B show a method 500 for determining processor-level effective power budgets and allocating processor operating modes, in accordance with an embodiment of the present principles.
Figure 5B:
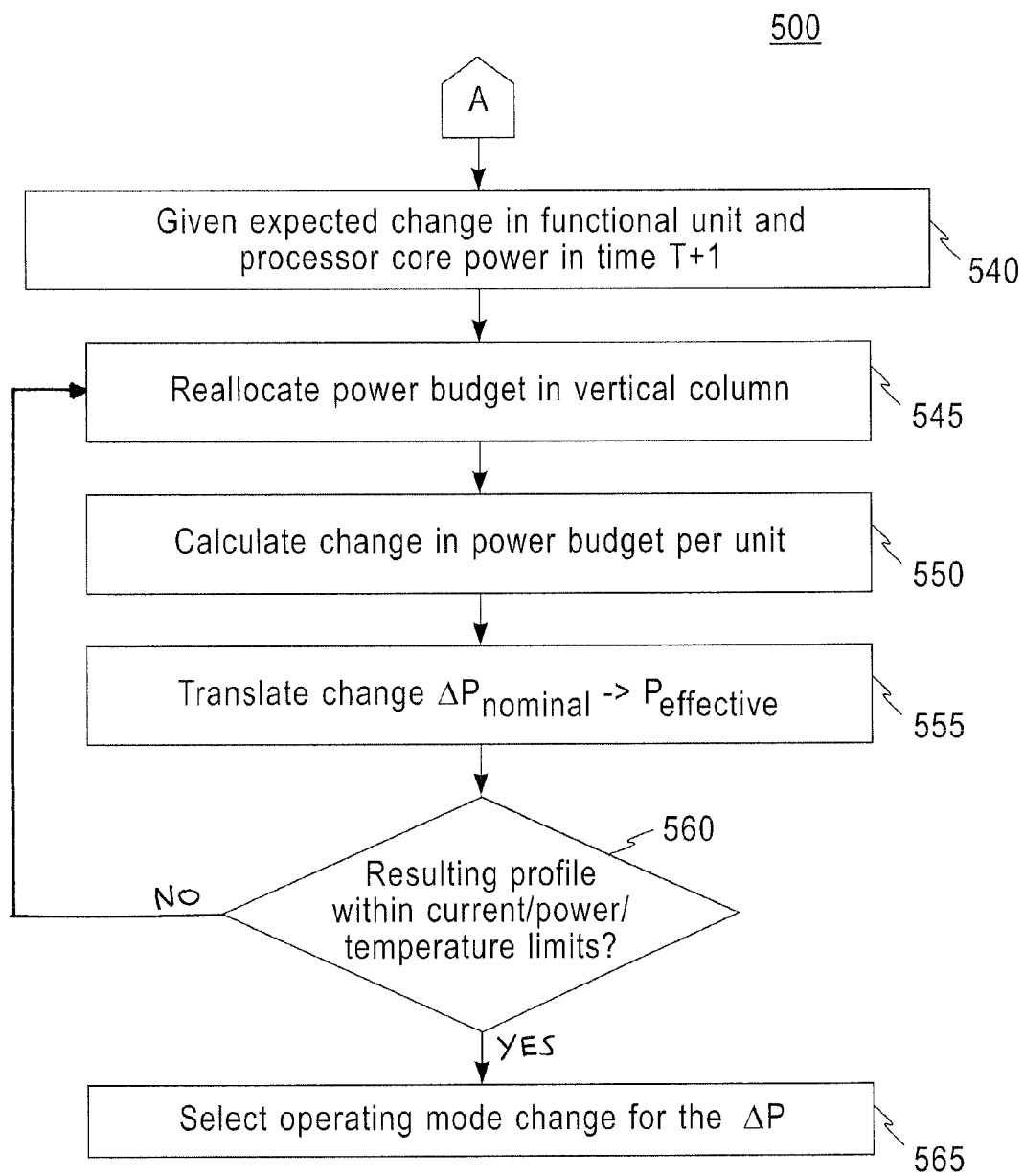

FIGS. 5A and 5B show a method 500 for determining processor-level effective power budgets and allocating processor operating modes, in accordance with an embodiment of the present principles. Of course, as noted above, the present principles are not limited solely to determining effective power budgets for processing elements, and the same may be applied to functional units, memory elements, and so forth. That is, given the teachings of the present principles provided herein, one of ordinary skill in the art can readily apply the same in order to determine effective power budgets for any component in a 3D chip stack, while maintaining the spirit of the present principles. To that end, we note that a memory element can include, but is not limited to, a RAM, a ROM, a cache, a register, and so forth. As one of ordinary skill in the art can appreciate, there is overlap between these designations as a cache can be considered a functional unit as well as a memory element. Nonetheless, for the sake of illustration and brevity, the following is primarily directed to power budgeting for processors, again noting that the present principles are not solely limited to the same.

At step 505, the total power budget P (watts) is input.

At step 510, the vertical current and temperature characteristics are input. Such characteristics may be determined as described with respect to method 400.

At step 515, a nominal power budget is (re)allocated within vertical limits/constraints.

At step 520, an effective power budget per functional unit and processor core is determined. In an embodiment, the preceding information can simply be looked up from already calculated data. We note that the terms "processor core", "processor", "processing unit", and "processing element" are used interchangeably herein.

At step 525, the effective power budget per functional unit and processor core is translated to a particular operating mode (e.g., voltage, frequency, simultaneous multi-threading (SMT) mode, performance, and so forth). In an embodiment, the characteristics of each mode are stored in a table and a simple look up is performed to obtain the characteristics. That is, the parameters of the effective power budget are mapped to parameters of one or more target operating modes.

At step 530, it is determined whether or not the power and performance requirements have been met. If not, then the method returns to step 515. If so, then the method proceeds to a step 535.

At step 535, it is determined whether or not the vertical constraints have been met. If not, then the method returns to step 515. If so, then the method is terminated.

At step 540, the expected change in functional unit and processor core power in time T+1 is input.

At step 545, the power budget in the vertical column (vertical structure) is reallocated.

At step 550, the change in the power budget per unit ($\Delta P_{nominal}$) is calculated.

At step 555, the change $\Delta P_{nominal}$ is translated to $\Delta P_{effective}$.

At step 560, it is determined whether or not the resulting profile is within the current/power/temperature limits. If not, then the method returns to step 545. Otherwise, the method proceeds to step 565.

At step 565, the operating mode change for the $\Delta P$ is selected.

It is to be appreciated that while one or more embodiments described herein may be so described primarily with respect to processors and power budgeting, the present principles are applicable to any component or circuit on a stratum of a 3D chip stack including, but not limited to, memories and other devices and type of circuitry, while maintaining the spirit of the present principles.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims:

What is claimed is:

1. A method for managing power distribution on a three-dimensional chip stack having two or more strata, a plurality of vertical power delivery structures, and multiple stack components, at least two stack components of the multiple stack components being on different ones of the two or more strata, the method comprising:

storing a plurality of operating modes that respectively have different power dissipations;

determining, by a controller, a respective effective power budget for each of the at least two stack components based on respective ones of the plurality of operating modes targeted for the at least two stack components, and power characteristics and thermal characteristics of at least some of the stack components inclusive or exclusive of the at least two stack components; and selectively accepting or re-allocating the respective ones of the plurality of operating modes targeted for the at least two stack components based on the respective effective power budget for each of the at least two stack components, power constraints, and thermal constraints, wherein the power constraints comprise vertical structure electrical constraints.

2. The method of claim 1, wherein the power constraints also comprise intra-stratum electrical constraints.

3. The method of claim 1, wherein the vertical structure electrical constraints are determined, at least in part, from electrical constraints of chip-to-chip connections.

4. The method of claim 1, wherein the power characteristics from which the respective effective power budget for each of the at least two stack components is determined are worst-case power characteristics.

5. The method of claim 1, wherein the at least two stack components comprise at least two processing elements, and the plurality of operating modes comprise a turbo mode, a nominal mode, a dynamic voltage and frequency scaling mode, and a power gating mode.

6. The method of claim 1, wherein the 3D chip stack comprises a plurality of regions, the method further comprises calculating a respective region-level budget for each of the plurality of regions, and the respective effective power budget for each of the at least two stack components is determined further based on the respective region-level budget for each of the plurality of regions.

7. The method of claim 6, wherein the respective region-level budget is calculated for a given one of the plurality of regions based on the power characteristics and the thermal characteristics of the stack components within the given one of the plurality of regions.

8. The method of claim 1, wherein the method further comprises shifting the power budget from at least a portion of one of the plurality of vertical power delivery structures to at least another portion of a same or another one of the plurality of vertical power delivery structures, when the respective power budget for at least one of the at least two stack components is not met.

9. The method of claim 1, wherein the power characteristics comprise power delivery characteristics, the power delivery characteristics comprising a number of strata in the 3D chip stack, and a number of through vias in the 3D chip stack or in at least one of the two or more strata.

10. The method of claim 1, further comprising applying a power shifting method to shift a power consumption on at least one of a vertical structure basis, a region-basis, and a stratum-basis.

11. The method of claim 10, wherein at least two of the two or more strata comprise devices having disparate technologies or disparate technology generations, and wherein the power shifting method is applied to shift the power consumption responsive to information relating to differences between the disparate technologies or the disparate technology generations.

12. The method of claim 1, wherein the respective ones of the plurality of operating modes targeted for the at least two stack components are selectively accepted or re-allocated further based on 3D floor-plan information for the 3D chip stack.

13. The method of claim 1, wherein the at least two stack components comprise at least two processing elements or at least two memory elements or at least two functional units.

14. A power manager for a three-dimensional chip stack having two or more strata, a plurality of vertical power delivery structures, and multiple stack components, at least two stack components of the multiple stack components being on different ones of the two or more strata, the power manager comprising:

a memory for storing a plurality of operating modes having different power dissipations; and a controller for determining a respective effective power budget for each of the at least two stack components based on respective ones of the plurality of operating modes targeted for the at least two stack components, and power characteristics and thermal characteristics of at least some of the stack components inclusive or exclusive of the at least two stack components, wherein the controller selectively accepts or re-allocates the respective ones of the plurality of operating modes targeted for the at least two stack components based on the respective effective power budget for each of the at least two stack components, power constraints, and thermal constraints, and wherein the power constraints comprise vertical structure electrical constraints.

15. The power manager of claim 14, wherein the power constraints also comprise intra-stratum electrical constraints.

16. The power manager of claim 14, wherein the vertical structure electrical constraints are determined, at least in part, from electrical constraints of chip-to-chip connections.

17. The power manager of claim 16, wherein the electrical chip-to-chip connections comprise at least one of vias and micro C4 connections.

18. The power manager of claim 14, wherein the 3D chip stack comprises a plurality of regions, said controller calculates a respective region-level budget for each of the plurality of regions, and the respective effective power budget for each of the at least two stack components is determined further based on the respective region-level budget for each of the plurality of regions.

19. The power manager of claim 18, wherein the respective region-level budget is calculated for a given one of the plurality of regions based on the power characteristics and the thermal characteristics of the stack components within the given one of the plurality of regions.

20. The power manager of claim 14, wherein the power budget is shifted from at least a portion of one of the plurality of vertical power delivery structures to at least another portion of a same or another one of the plurality of vertical power delivery structures, when the respective power budget for at least one of the at least two stack components is not met.

21. The power manager of claim 14, wherein the controller applies a power shifting method to shift a power consumption on at least one of a vertical structure basis, a region-basis, and a stratum-basis.

22. A method for managing power distribution on a three-dimensional chip stack having two or more strata and multiple stack components, the multiple stack components including two or more processors on different ones of the two or more strata and a plurality of vertical power delivery structures, the method comprising:

storing a plurality of processor operating modes that respectively have different power dissipations;

determining, by a controller, a respective effective power budget for each of the two or more processors based on respective ones of the plurality of processor operating modes targeted for the two or more processors, and power characteristics and thermal characteristics of at least some of the stack components; and shifting the respective effective power budget for at least one of the two or more processors from at least a portion of one of the plurality of vertical power delivery structures to at least another portion of a same or another one of the plurality of vertical power delivery structures, when the respective power budget for the at least one of the two or more processors is not met, wherein the power constraints comprise vertical structure electrical constraints.

23. The method of claim 22, wherein the vertical structure electrical constraints are determined, at least in part, from electrical constraints of chip-to-chip connections.

24. A power manager for a three-dimensional chip stack having two or more strata and multiple stack components, the multiple stack components including two or more processors on different ones of the two or more strata and a plurality of vertical power delivery structures, the power manager comprising:

a memory for storing a plurality of processor operating modes having different power dissipations; and a controller for determining a respective effective power budget for each of the two or more processors based on respective ones of the plurality of processor operating modes targeted for the two or more processors, and power characteristics and thermal characteristics of at least some of the stack components, wherein said controller shifts the respective effective power budget of at least one of the two or more processors from at least a portion of one of the plurality of vertical power delivery structures to at least another portion of a same or another one of the plurality of vertical power delivery structures, when the respective power budget for the at least one of the two or more processors is not met, and wherein the power constraints comprise vertical structure electrical constraints.

25. The power manager of claim 24, wherein the vertical structure electrical constraints are determined, at least in part, from electrical constraints of chip-to-chip connections.

* * * * *